Figure 1:
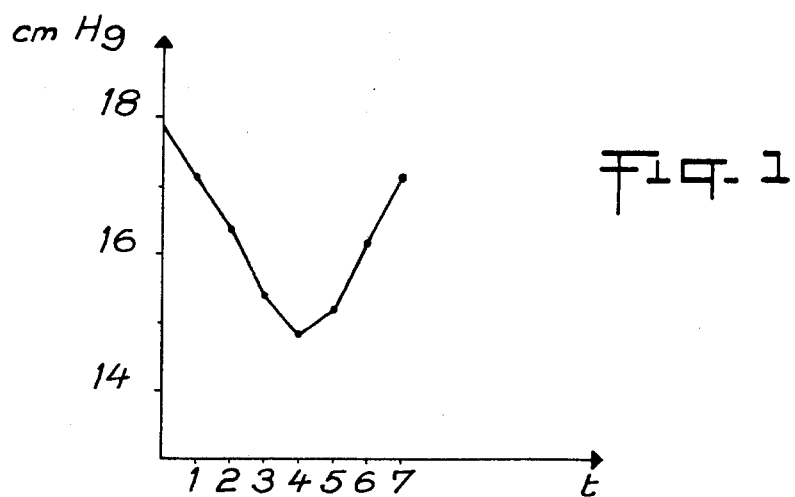

United States Patent [19]
Thuillier et al.

[11] 3,879,547
[45] Apr. 22, 1975

[54] **PROCESS FOR OBTAINING AN ANTI-HYPERTENSIVE PRINCIPLE FROM *ANACARDIUM OCCIDENTALE* L.**

[75] Inventors: Yvonne Thuillier, Paris, France; Paulette Giono-Barber, born Michel, Dakarfann, Senegal

[73] Assignee: Albert Rolland, S.A., Paris, France

[22] Filed: Nov. 20, 1973

[21] Appl. No.: 417,519

Related U.S. Application Data

[63] Continuation-in-part of Ser. No. 162,820, July 15, 1971, abandoned.

[30] Foreign Application Priority Data
July 16, 1970 United Kingdom............... 34608/70

[52] U.S. Cl. ................................................ 424/195
[51] Int. Cl............................................ A61k 27/14

[58] Field of Search .................................... 424/195

[56] References Cited
OTHER PUBLICATIONS

U.S. Dispensatory – 25th edition – 1955 – page 206.
Boyd – J. of American Institute of Homeopathy Vol. XXI No. 1 Jan. 1928 pages 7, 8, 12 and 13.

*Primary Examiner*—Sam Rosen

[57] ABSTRACT

A process for extracting an anti-hypertensive principle for treatment of animals from the bark of *Anacardium occidentale* L. by treatment of the bark with a series of solvents of increasing polarity and then isolating the tannins containing the anti-hypertensive principle by means of caffein.

3 Claims, 3 Drawing Figures

PROCESS FOR OBTAINING AN ANTI-HYPERTENSIVE PRINCIPLE FROM ANACARDIUM OCCIDENTALE L

This application is a continuation-in-part of application Ser. No. 162,820, filed July 15, 1971 and now abandoned.

The present invention relates to extracting an anti-hypertensive principle for treatment of animals from the bark of *Anacardium occidentale L.* The term "animals" is intended to include not only monkeys, but also rodents, such as rats.

*Anacardium occidentale L.*, the cashew tree, is a tree of North American origin, planted widely in Senegal. The fruit, the anacard, cashew or cashew nut, has a certain number of external medical uses, such as the treatment of ulcers and verrucas. The main therapeutic use of the fruit is in topical anti-leprosy treatment. The juice of the mesocarp is allowed to run onto the leprous spots and anti-leprosy ointments are applied to the artificially produced sores produced by the juice.

It is known from the publication of Aguiar, et al., in the Brazilian review "Anals da Faculdade da Medecina da Universidade do Recife," volume 18, No. 2, pages 193-7 (1958), that the bark of *Anacardium occidentale L.* contains an active hypoglycaemia-inducing agent, which is obtained by treating powdered anacardium bark with boiling water (decoction), the latter activity being demonstrated in rats treated with decoction of 50 g. of bark per litre of water. No anti-hypertensive action alongside the hypoglycaemia-inducing activity of the extract produced in accordance with such a process has been discovered.

In our copending British Pat. Application No. 36,427 of 19th July 1969, we have described an extraction process which is different from that of De Aguiar, according to which the bark of *Anacardium occidentale L.* is macerated with water, in the absence of light and at a low temperature, preferably between about 0° and 5°C. The extract obtained by dipping the bark in cold water and heating the latter to the boil showed no anti-hypertensive activity whatsoever; this indicates the need to carry out the process at a low temperature and in the dark to obtain an anti-hypertensive extract.

The present invention provides a new process for the extraction of *Anacardium occidentale L.* which yields a much purer product than that obtained according to the process of our aforesaid British application. It has been found, surprisingly, that the active anti-hypertensive principle is contained in the tannins of the bark. The new process therefore relates to the isolation of the purified anti-hypertensive active principle from the tannins of the bark.

The new process for obtaining an extract of bark of *Anacardium occidentale L.* possessing an anti-hypertensive action in animals comprises:

a. subjecting the ground bark to at least one extraction with petroleum ether;

b. after removing the petroleum ether, subjecting the insoluble residue which is left to at least one extraction with diethyl ether;

c. after removing the diethyl ether, subjecting the insoluble residue which remains to at least one extraction with ethanol, methanol, a mixture thereof, or a mixture of either or both with water, d. after removing the insoluble residue and concentrating the soluble fraction according to (c) in vacuo to produce a dry extract, dissolving the said dry extract in water, and collecting the anti-hypertensive principle by precipitation with an alkaloid or hide powder, each of the extractions according to (a), (b) and (c) being carried out in the absence of light and at a low temperature, and the process of concentration in vacuo being carried out at a temperature below 60°C.

In the process of the invention, the ground bark of *Anacardium occidentale L.* is treated with solvents of increasing polarity. In the first place, the waxes and greases contained in the bark are removed by treatment with petroleum ether followed by diethyl ether. The insoluble residue which remains is extracted with a solvent which makes it possible to dissolve the tannins contained in the starting material. Various solvents, such as water, alcohols and acetone are known for the purpose of dissolving the tannins. In the present case, it has been found that acetone does not permit the active principle to be extracted in good yield.

The minimum duration of each extraction is 3 hours. It is desirable, especially in stage (a), for the duration of treatment to exceed the minimum duration if the bark is not finely ground. Under such circumstances it is on the whole preferable that the duration of extraction with petroleum ether should be at least 8 hours in order to obtain good yields.

According to a preferred embodiment of the new process:

a. 20 to 80 g. of bark are treated with 1 litre of petroleum ether, b. the fraction which is insoluble in the petroleum ether is treated with 1 litre of diethyl ether, and c. the fraction which is insoluble in the diethyl ether is treated with 1 litre of ethanol, methanol, a mixture thereof or a mixture of either or both with water, and d. after removing the insoluble residue which remains and concentrating the soluble fraction according to (c) in vacuo at temperature below 60°C., to obtain a dry extract, the said extract is dissolved in water and the active principle is collected by precipitation with caffein or hide powder, each of the extractions (a), (b) and (c) being carried out in the absence of light, at a temperature of between 0° and 15°C., preferably between 2° and 5°C., and for at least 3 hours.

The solvent preferred at stage (c) for dissolving the tannins is a water-ethanol or water-methanol mixture containing 35 to 85%, and preferably 75%, by volume of the alcohol.

To precipitate the tannins containing the anti-hypertensive fraction, either an alkaloid or hide powder is used. Amongst the alkaloids, good results have been obtained by reacting caffein with the dry extract obtained by concentrating the soluble fraction according to (c). Preferably 5 parts by weight of said dry extract are dissolved in water and reacted with an aqueous solution of caffein containing about 1.32 parts by weight of caffein. In general, 5 g. of the said dry extract are dissolved in 30 ml. of water and reacted with 110 ml. of an aqueous solution containing 12 g. of caffein/l.

The precipitate thus obtained is redissolved and the caffein is extracted with chloroform. Preferably, the said precipitate is dissolved in the minimum amount of methanol (about 10 to 20 ml. per 5 g. of the said dry extract), water (250 ml. for the amounts indicated above) is added, and three extractions are carried out with chloroform (using, in each case, 10 to 100 ml.

preferably 15 to 50 ml., of chloroform for the amounts indicated above).

The methanol-water phase is then concentrated in vacuo at a temperature below 60°C., until dry. To purify the powder thus obtained, it is redissolved in the minimum amount of methanol and precipitation is effected by adding ether (CH₃OCH₃). This purification is aimed at reducing the toxicity of the active antihypertensive principle, as will be shown later.

Hide powder is a reagent used by tanners to characterize tannins (which are adsorbed by hide powder). To recover the tannins which have been adsorbed, a treatment on an ion exchange resin is preferably carried out, the product thereafter being purified, if necessary, as described for the extract of the methanol-water phase.

The successive operations mentioned above are the result of simultaneous chemical and pharmacodynamic research which have made it possible, first to follow the active principle in the various extracts, and secondly to detect any possible degradation, dilution or concentration of the active principle during the treatments to which it is subjected, as compared with the aqueous extract, containing 50 g. per litre, obtained by maceration in accordance with the British Application mentioned above.

The barks were successively exhaustively extracted with solvents of increasing polarity and antihypertensive properties of the various extracts were assessed by the following two methods:

1. Indirect method

By oral administration to, or by injection into, normal rats, carotid-hypertensive rats, and renal-hypertensive rats;

2. Surgical method

Under an anaesthetic, using a carotid cannula, and without anaesthetic, using a cannula left in the abdominal aorta, all the rats used weighing between 250 and 300 g.

The following Examples illustrate the invention.

EXAMPLE 1

12 g. of bark of *Anacardium occidentale L.*, ground in a mixer, or defibred and powdered, are treated with 200 cm³ of petroleum ether for 8 hours at 2°C., to "degrease" it. A filtrate (A) and an insoluble residue (B) are obtained. 0.053 g. of a pasty powder is recovered from the filtrate (A) by concentration in vacuo at a temperature below 60°C. This powder is soluble in petroleum ether.

The residue (B) which is insoluble in petroleum ether is extracted with 200 cm³ of diethyl ether for 8 hours at 2°C., in the dark. A filtrate (C) and an insoluble residue (D) are obtained. 0.084 g. of product are recovered from the filtrate (C) by distilling the diethyl ether at a temperature below 60°C. in vacuo.

The residue (D) which is insoluble in diethyl ether is extracted with a 75% by volume aqueous solution of ethanol for 24 hours at 2°C. in the dark. A filtrate (E) and an insoluble residue (F) are obtained. After evaporation of the filtrate (E) in the dark, in vacuo, at a temperature below 60°C., 4.32 g. of brown powder (ET) are obtained.

On extraction of the residue (F), which is insoluble in 75% strength ethanol solution, with 200 cm³ of water for 24 hours in the dark at a temperature of 2°C., it is possible to recover 1.22 g. of a dark brown powder after distilling the solvent under reduced pressure at a temperature below 60°C.

The extracts obtained after the extractions with petroleum ether, diethyl ether and 75% strength ethanol were tested in rats as indicated above and compared with the aqueous extract, containing 50 g. per litre, obtained by maceration for 24 hours in water in accordance with the British Pat. application No. 36,427, referred to above.

The powders obtained from the filtrates (A) and (C) and from the residue (F) proved inactive when administered to rats. Conversely, extract ET, in an aqueous solution containing 20 g/l, gave positive results on injection of 0.1 to 0.3 cm³ of the said aqueous solution.

The aqueous solution, containing 50 g/l, of the extract obtained by aqueous maceration in accordance with the aforesaid British specification also gives good results; in rats, a drop of 1 to 2 cm Hg. is observed for about twenty minutes after administration of a dose of 1 ml/kg of the said solution.

On replacing the 75% ethanol with 75% by volume methanol, it was found that the activity in rats of the soluble extract in the said solution is substantially the same. In general, one-third of the weight of bark of *Anacardium occidentale L.* is obtained from the extract with 75% ethanol.

Furthermore, it has been observed that starting from some of the dry extracts obtained by the process described above, certain compounds precipitated spontaneously in alcoholic solution as soon as the said dry extracts are dissolved. Thus a quantity of the soluble extract obtained in stage (c) with ethanol was dissolved in methanol. After the solution has stood and the precipitate then recovered by centrifuging, the product obtained was tested in rats. It was sparingly soluble in water, and proved inactive at a concentration of 3 g/l. Equally, starting from extract ET, crystals were sometimes recovered in an identical manner which had a salty taste, were sparingly soluble in water, and were inactive in rats at a concentration of 3 g/l in water.

Extract ET, freed from these impurities, is stable. When stored in the dark, it shows substantially the same activity after several months.

A quantity of the extract ET was dissolved in methanol and the solution left to stand for at least 24 hours. The precipitate obtained was covered by centrifuging. Crystals having a salty taste were also recovered from the extract obtained with 75% ethanol. These two products, which are sparingly soluble in water, were tested on rats at a concentration of 3%°, and proved inactive.

Study of the activity in rats made it possible to establish that generally the extract obtained with 75% ethanol, at a concentration of 2% based on the solids content of the extract, gives positive results on injection of 0.1 to 0.3 cm³ of solution.

The aqueous extract of 5% strength based on the weight of dry bark also gives good results: a decline of 1 to 2 cm Hg. occurring over about 20 minutes.

Summarizing, the extract obtained with 75% strength ethanol (ET) is active at a concentration of 2% when 0.1 to 0.3 cm³ is injected into rats weighing 250 to 300 g.

The active principle appears to be relatively stable; when stored in the dark, it shows substantially the same activity after 1 to 2 months.

The extraction according to Example 1 is represented schematically in Table I below.

TABLE I

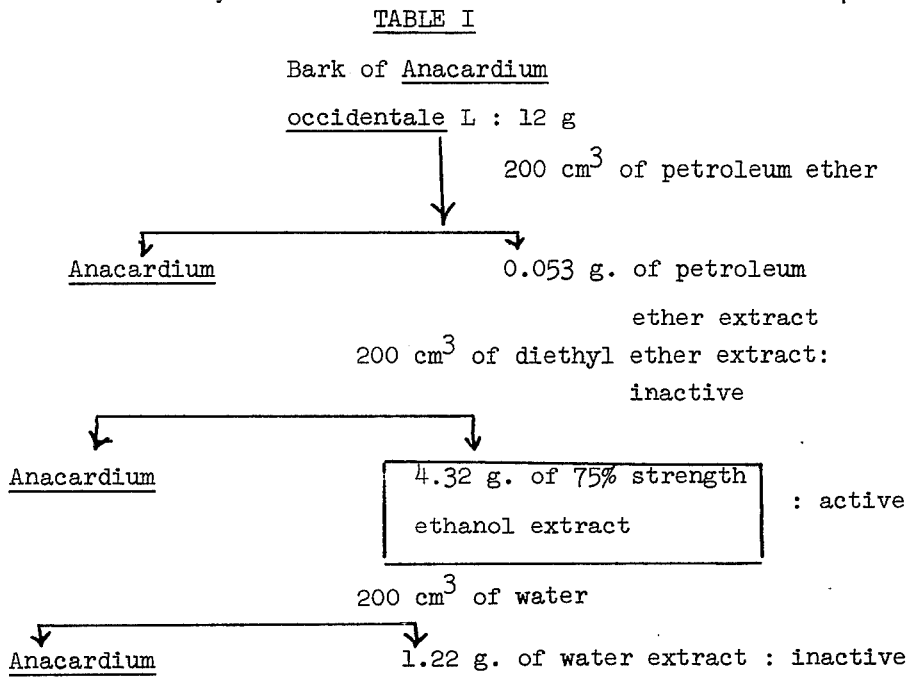

2. Purification stage — Purification of the ethanol fraction ET

In view of the preceding results, attempts were made to separate a tannins fraction from a non-tannins fraction. For this purpose, tannins were precipitated with a solution of caffein.

The tannins in 5 g. of ET, dissolved in 30 ml. of water, are precipitated by adding 110 ml. of a solution of 12 g. of caffein/l. The precipitate obtained is centrifuged or filtered off, washed with water and dissolved in the minimum amount of methanol (about 12 ml.). This solution of tannins in methanol is made up to 250 cm³ with water and extracted three times with chloroform to free it of caffein. The aqueous methanolic solution obtained is evaporated in vacuo. 2.80 g. of powder (T.A.N.) are obtained. The chloroform solutions are evaporated. 1.06 g. of caffein are recovered for the tannins and 0.120 g. of caffein for the non-tannins, representing a recovery of 1.18 g. of caffein for 1.3 g. employed.

The filtrate is an aqueous solution which in principle is free of tannins. This solution is extracted with chloroform and evaporated in vacuo. 1.60g. of powder (S.T.A.N.) are obtained.

Balance: With 5 g. of *Anacardium occidentale* L bark, 2.8 g. of "tannins" and 1.60 g. of "non-tannins" are obtained, in accordance with a fractionation which can schematically be represented in Table II below.

TABLE II

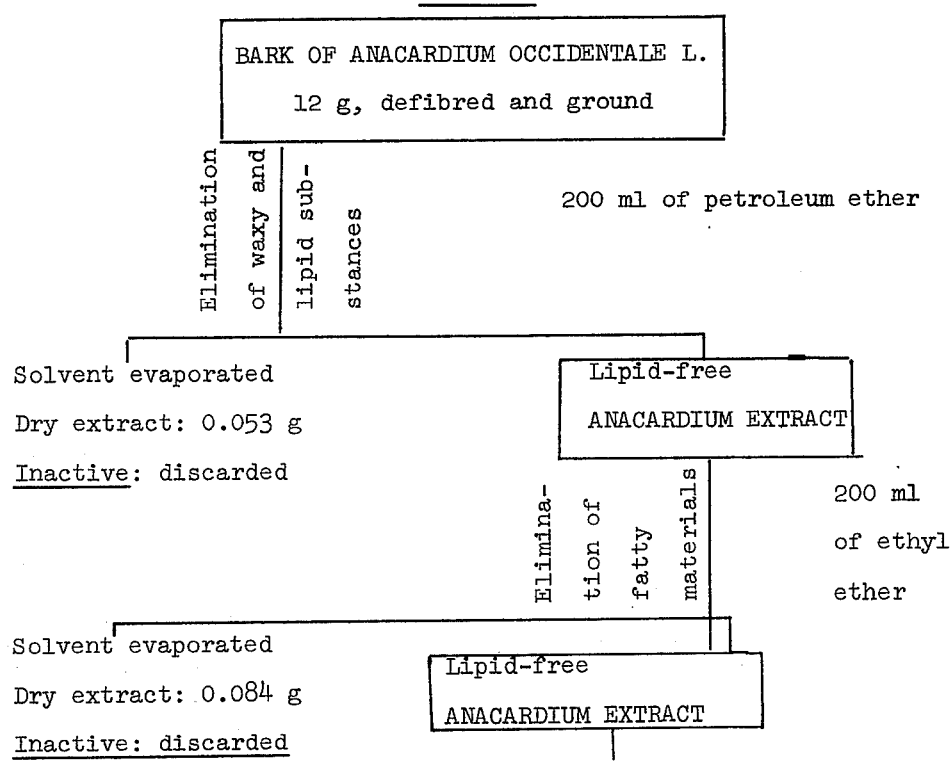

Table II—Continued

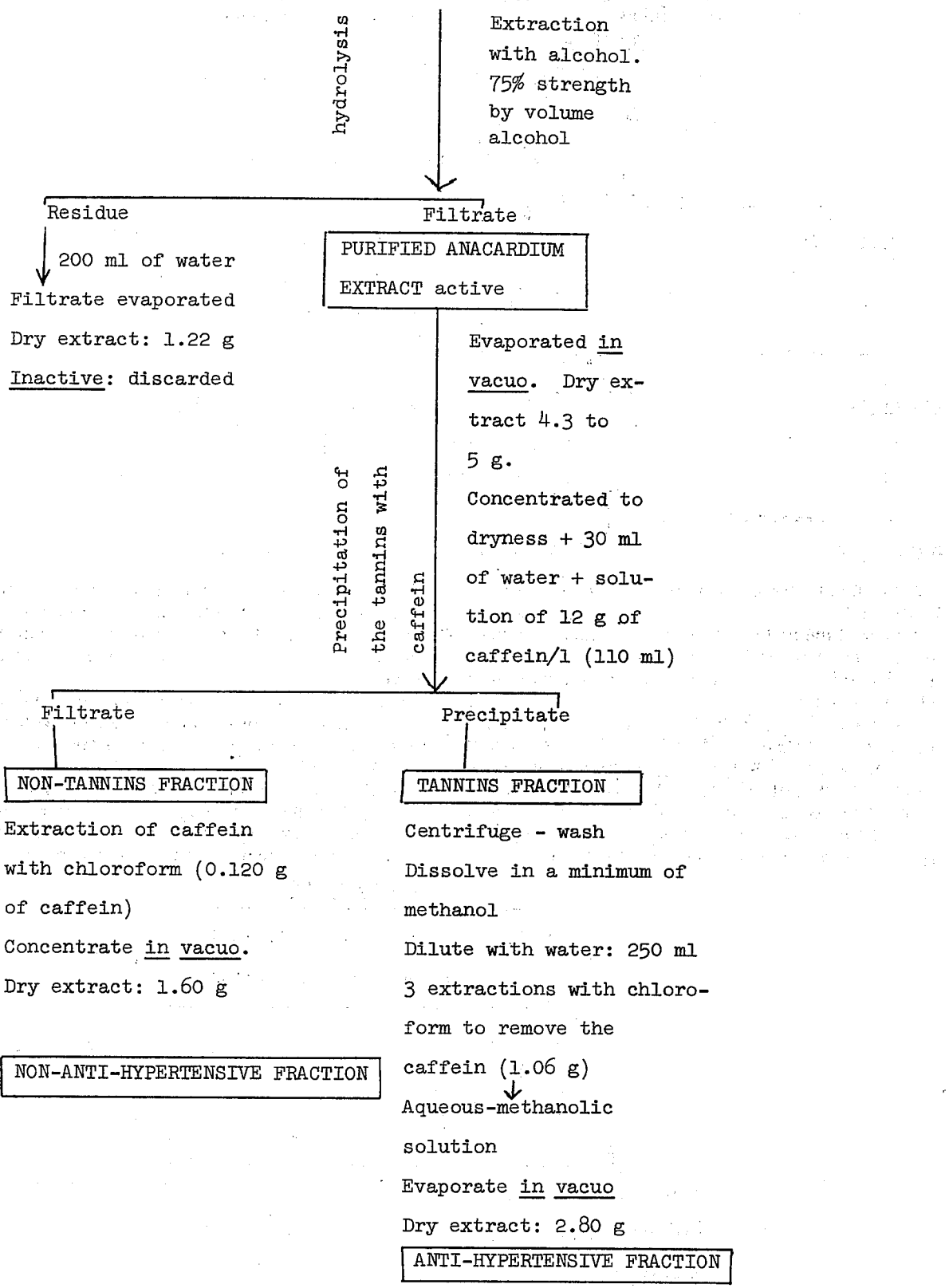

This method of fractionation makes it possible to recover a tannins fraction and a non-tannins fraction without adulterating the solutions with other products, because the caffein is removed.

Physiological experiments relating to the activity of the various extracts were carried out.

An aqueous solution of non-tannins S.T.A.N. at a concentration of 30 g/l was injected intravenously into rats at doses of 0.1 to 0.3 cm³, and does not cause any lowering of (blood) pressure.

The aqueous solution containing 10 g. of tannins T.A.N./l is very active when injected into rats at doses of 0.1 to 0.2 cm³.

The solution containing 10 g. of E.T./l under the same conditions has practically no effect. An aqueous solution of 20 g. of extract ET/l shows a good activity when injected into rats at doses of 0.1 to 0.2 cm³.

It follows from the series of experiments with the solutions of extracts S.T.A.N., T.A.N. and ET that the active principle behaves like a tannin.

3. Purification of the tannin extract T.A.N.

The solid extract T.A.N. is redissolved in the minimum amount of methanol (about 10–12 ml) and then reprecipitated with dimethyl ether. The ether is added dropwise to the methanol solution until the product has precipitated completely. The mixture is filtered. Dry weight: 2.50 g.

If the T.A.N. extract is compared with that obtained by dissolving in methanol and precipitating with ether, the same activity is observable, but with a reduction in toxicity when injected intreperitoneally into the animal. This may be due to the fact that an inactive product dissolves in the ether. In particular, the absence of oxidized forms is observed.

The difference in toxicity is illustrated in Table III below:

TABLE III

| Nature of the extract injected as a 10 g/l aqueous solution | LD-50 in mice, when administered intraperitoneally |
|---|---|
| Dry extract according to British Application No. 36,427/69 | 135 mg/kg |
| Extract ET | 280 mg/kg |
| Extract T.A.N. after purification in accordance with Example 1, Section 3 | 600 mg/kg |

Table III shows first that on purification by precipitation with caffein followed by the treatment according to Example 1, Section 3, the ID-50 changes from 280 mg/kg to 600 mg/kg and, secondly, that the process of the invention represents a technical advance because the final product obtained is much less toxic than the extract obtained by aqueous maceration in accordance with the British specification.

EXAMPLE 2

Treatment with hide powder.

An attempt was made to separate the tannins and non-tannins fractions with hide powder, starting from the soluble extract ET of stage (c).

0.400 g. of ET dissolved in 100 ml. of water are stirred with 6.25 g. of dry hide powder for 1 hour. The tannins are combined with the hide powder. After filtration, followed by evaporation of the filtrate to dryness in vacuo at a temperature below 60°C., 0.195 g. of non-tannins, and hence 0.400 − 0.195 = 0.205 g. of tannins adsorbed by the hide powder, are obtained. A solution of 20 g/l was made up with these non-tannins and then tested; it shows no activity.

The same process was carried out on a solution of 0.350 g. of tannins (T.A.N.) in 100 cm³. After filtration and evaporation, 0.024 g. of sparingly water-soluble non-tannins were found, and this material did not show an activity in aqueous solution at a concentration of 20 g/l.

In order to obtain the tannins adsorbed on the hide powder, an ion exchange resin can be used; the tannins fraction thus recovered is dried in vacuo at a temperature below 60°C., and can then be purified by the process of Example 1, Section 3.

The various experiments described above show that the active fraction behaves like a tannin because it is adsorbed by the hide powder and is precipitated by the alkaloids.

In order to study the anti-hypertensive action, experiments were carried out on normal rats and on rats rendered hypertensive by three different types of experimental hypertension (renal, metacorticoid and neurogenic). The extract obtained according to Example 1, Section 3, was administered orally, at a dose of 40 mg/kg, to batches of 8 to 14 animals.

The arterial pressure is recorded before forced feeding and thereafter every hour. It drops slowly, with a maximum action at between 2 and 5 hours after administration, followed by a rise between 5 and 9 hours, in accordance with the expected progression.

The normal control animals show little reaction.

The neurogenic hypertensive rats showed the greatest drop in pressure, the average blood pressure falling 4.2 cm ± 0.5 cm. Hg. over the course of about 9 hours.

In the metacorticoid hypertensive rats, an average reduction in blood pressure of 3.1 ± 1.3 cm. Hg. was observed.

In the renal-hypertensive rats a reduction in average blood pressure of 3.6 ± 0.5 cm. Hg. was observed.

In general, the rats withstood the administration of the product well. Some of the results obtained are shown graphically in accompanying FIGS. 1 and 2. FIG. 1 represents the average curve of the arterial blood pressures of 8 renal-hypertensive rats which were orally (forced feeding) given 0.4 ml. (40 mg/kg) of an aqueous solution containing 20 g/l of the extract obtained according to Example 1.

Figure 2:
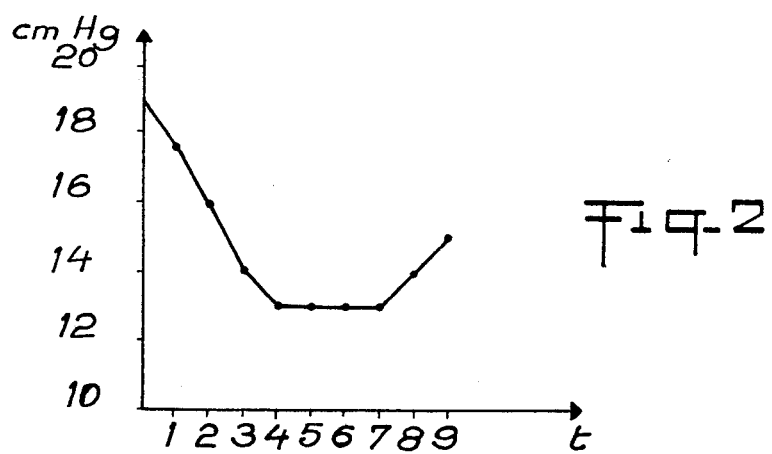

FIG. 2 shows the average curve of the arterial blood pressures of 13 renal-hypertensive rats after intraperitoneal injection of 0.2 ml. (20 mg/kg) of an aqueous solution containing 20 g/l of the extract obtained according to Example 1, Section 3.

In FIGS. 1 and 2, the arterial blood pressure is expressed in cm. Hg. (as ordinates) as a function of the time in hours (as abscissae).

Furthermore, the same tests of anti-hypertensive activity were carried out on renal-hypertensive monkeys. As was to be expected, the anti-hypertensive action is much greater in experimentally hypertensive monkeys than in normal monkeys.

The extract according to the invention, as a 10 g/l. aqueous solution, was administered orally at a dose of 3 mg/kg. to 8 hypertensive monkeys for a period of 7 days. The arterial blood pressure was measured before the start of the treatment and then daily at 3 and 5 hours after administration (effected by forced feeding) for the entire duration of the treatment. At the end of the treatment, lasting 7 days, the average drop in arterial blood pressure was 3.4 cm. of mercury and the blood pressure started to rise again on the 11th day following the start of the treatment.

Figure 3:
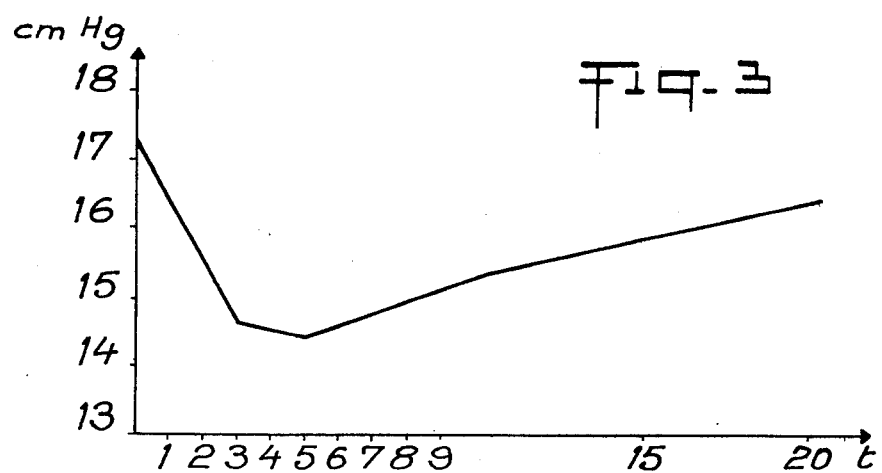

Another series of experiments carried out on 10 renal-hypertensive monkeys are summarized in FIG. 3. These animals received, by forced feeding, 10 ml. of an aqueous solution of 20 g/l. of the extract according to the invention (dose 40 mg/kg.). The duration of the action in hours after administration has been shown as the abscissae and the average blood pressure, expressed in cm. of mercury, as the ordinates.

Investigations were also carried out on the mechanism of action of the extract obtained by the process of the invention. The results observed are summarized below.

The cardiac frequency varies little under the influence of the extract. The extract produces little change in adrenaline hypertension. Atropine does not hinder the hypotensive action of the extract and the action appeared not to be due to a muscarinic effect. The hypertensive action persists after lowering of the pressure by injection of 50 mg. of Penthonium.

The methods of characterization of the various compounds contained in the active principle are given below.

a. Extract E.T. - Test for tannins

1. With 1% aqueous $FeCl_3$ solution, a white precipitate is obtained,
2. with STIASNY reagent, a curdy pink precipitate is obtained after filtering and adding an excess of sodium acetate, and a slight blue-violet coloration is obtained with $FeCl_3$;
3. with saline gelatine, a white precipitate is obtained.

These various reactions suggest the presence of a preponderance of condensed tannins.

b. Test for flavonoids

The SHIBATA reaction gives an orange coloration in isoamyl alcohol, which suggests the presence of free flavonoids. The same reaction without magnesium filings does not give a cherry-red or violet coloration but an orange coloration probably corresponding to a catechol.

c. Test for quinones

The maceration of 2 g. of bark with chloroform for 1 hour followed by exhaustive extraction with sodium hydroxide solution does not give a color. The same reaction carried out after hydrolysis gives an orange-yellow coloration. These results suggest a substance which after hydrolysis gives the color reaction of quinones with alkalis.

d. The test for alkaloids and saponins proved negative.

Additionally, tests were carried out to attempt to separate the various extracts by chromatography on a plate covered with silica gel. Good separation is achieved for E.T. and S.T.A.N. with anisaldehyde as the developer and butanol, acetic acid and water, in the ratio of 60/40/40 by volume as the eluting agent. 3 Well-defined black spots are thus observed, identical for E.T. and S.T.A.N., namely a major spot (Rf = 0.34), an average spot (Rf = 0.44) and a slight spot (Rf = 0.04).

The characterization of the T.A.N. extract purified according to Example 1, Section 3, was carried out by thin layer chromatography (support : silica gel or polyamide gel; eluting agent : butanol-acetic acid). In an alkaline medium (5 N KOH) no migration occurs. In an acid medium migration does occur (Rf = 0.65, developer : diazotized p-nitroaniline).

Furthermore, using a bark powder of which the composition is generally the following:

| | |
|---|---|
| Water | 10 to 15% by weight |
| Tannin fraction T.A.N. | 19 to 23% by weight |
| Non-tannin fraction (S.T.A.N.) removed according to the process of the invention | 3 to 5% by weight |
| Gums (containing alkaloids), resin, varnish and wax | 57 to 68% by weight | the presence of the following was observed: a large amount of thiols; reducing sugars or phosphate esters of sugars, desoxyribosides and indole rings.

We claim:

1. A process for extracting an anti-hypertensive principle for treatment of animals from the bark of Anacardium occidentale L. comprising the steps of grinding the bark, treating 20 to 80 grams of the ground bark with 1 liter of petroleum ether in the absence of light at a temperature of from 0° to 15°C. for 8 hours, filtering the treated bark to obtain an insoluble residue and a filtrate, treating the insoluble residue with 1 liter of diethyl ether in the absence of light at a temperature of from 0° to 15°C. for 8 hours, filtering the treated insoluble residue to obtain and insoluble residue and a filtrate, treating the insoluble residue with an alcohol reagent selected from the group consisting of a 35% to 85% aqueous solution of ethanol, methanol and mixtures thereof in the absence of light at a temperature of from 0° to 15°C. for 24 hours, filtering the alcohol treated insoluble residue to obtain a filtrate and an insoluble residue, drying the filtrate by removing the alcohol reagent in the absence of light and in vacuo at a temperature below 60°C. to obtain a dry extract containing the antihypertensive principle, dissolving 5 grams of the dry extract in about 30 ml. of water, treating the solution with 110 ml. of water containing 12 grams of caffein per liter to precipitate tannis and the anti-hypertensive principle, separating the precipitate from the remaining liquid, dissolving the precipitate in 10 to 20 ml. of methanol per 5 grams of precipitate, adding water to make a total of 250 ml., treating the solution with 10 to 100 ml. of chloroform three successive times to extract the caffein, and concentrating the remaining water-methanol phase in vacuo at a temperature below 60°C until dry.

2. A process as claimed in claim 1, wherein the alcohol reagent is selected from the group consisting of a 75% aqueous solution of ethanol, methanol and mixtures thereof.

3. A process as claimed in claim 1 and further comprising redissolving the dry extract obtained by concentrating the water-methanol phase in 10 to 12 ml. of methanol and treating with dimethyl ether to form a precipitate and filtering said precipitate.

* * * * *